W. T. GRAY & E. S. HASKIN.
SAWDUST CONVEYER FOR CIRCULAR SAWS.
APPLICATION FILED AUG. 26, 1911.
1,014,872.
Patented Jan. 16, 1912.
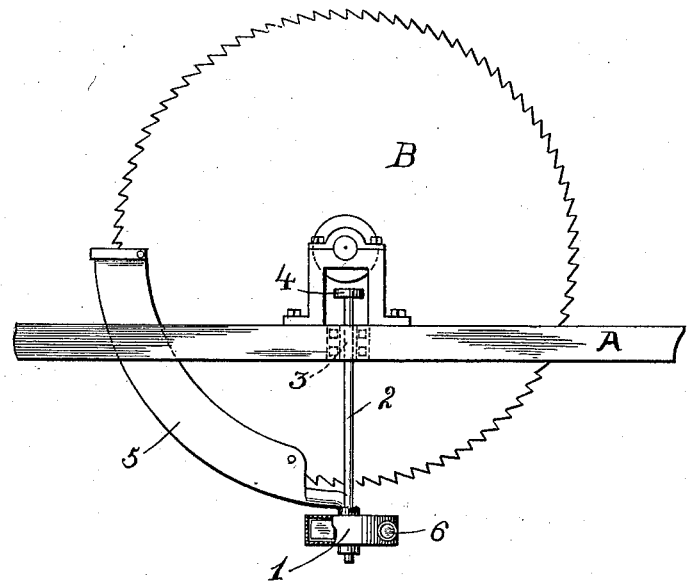
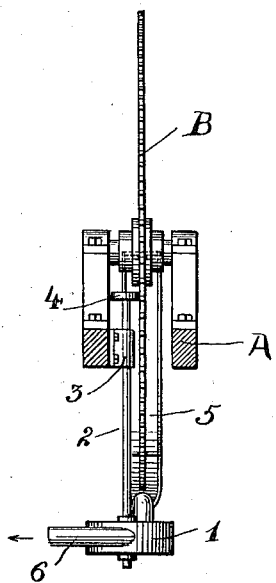

UNITED STATES PATENT OFFICE.

WILLIAM T. GRAY AND ERNEST S. HASKIN, OF VIENNA, MISSOURI; SAID HASKIN ASSIGNOR TO SAID GRAY.

SAWDUST-CONVEYER FOR CIRCULAR SAWS.

1,014,872. Specification of Letters Patent. Patented Jan. 16, 1912.

Application filed August 26, 1911. Serial No. 646,211.

*To all whom it may concern:*

Be it known that we, WILLIAM T. GRAY and ERNEST S. HASKIN, citizens of the United States, residing at Vienna, in the county of Maries and State of Missouri, have invented certain new and useful Improvements in Sawdust-Conveyers for Circular Saws, of which the following is a specification.

Our invention relates to devices for removing saw dust from saw mills, and has for its object the provision of a blower operated by a shaft driven by friction gearing connected directly with the saw.

Our invention will be described in detail hereinafter and illustrated in the accompanying drawings in which—

Figure 1, is a side view of a saw with our improved conveyer shown associated therewith, and Fig. 2, an edge view of the saw.

In the drawings similar reference characters indicate corresponding parts in both views.

A indicates a fragment of the saw frame and B the saw.

1 indicates a fan casing, 2 the shaft for driving the fan journaled in boxing 3 secured to frame A, said shaft being actuated by a friction wheel 4 secured thereto and engaging the surface of the saw.

5 indicates a trough to convey the saw dust to fan casing 1 and 6 the discharge duct for conveying the saw dust from the casing 1.

In operation the rotation of the saw serves to drive the shaft 2 by means of the friction wheel 4 and to thereby actuate the fan or blower in the casing 1. The speed of the fan may be adjusted by setting the wheel 4 in the position desired to give the shaft 2 the proper number of rotations relative to the number of rotations of the saw to most effectually operate the fan.

Having thus described our invention what we claim is—

1. In combination with a circular saw, a fan conveyer, a shaft for actuating said fan conveyer, and a friction wheel secured to said shaft and engaging the saw, the speed of the fan shaft being regulated relative to the speed of the saw by adjusting the friction wheel thereon.

2. In combination with a circular saw, a fan conveyer, a shaft for actuating said fan conveyer, a friction wheel secured to said shaft and engaging the saw, a trough inclosing the edge of the saw and leading to the fan conveyer, and a discharge tube leading away from the conveyer, the speed of the fan shaft being regulated relative to the speed of the saw by adjusting the friction wheel thereon.

In testimony whereof we hereto affix our signatures in the presence of two witnesses.

WILLIAM T. GRAY.
ERNEST S. HASKIN.

Witnesses:
EVERETT M. KING,
JOHN W. TERRILL.

---

Copies of this patent may be obtained for five cents each, by addressing the "Commissioner of Patents, Washington, D. C."